(12) United States Patent
Brecher et al.

(10) Patent No.: US 8,507,878 B1
(45) Date of Patent: Aug. 13, 2013

(54) SCINTILLATION MATERIALS WITH REDUCED AFTERGLOW AND METHOD OF PREPARATION

(76) Inventors: Charles Brecher, Lexington, MA (US); Vivek Nagarkar, Newton, MA (US)

( * ) Notice: Subject to any disclaimer, the term of this patent is extended or adjusted under 35 U.S.C. 154(b) by 178 days.

(21) Appl. No.: 12/959,437

(22) Filed: Dec. 3, 2010

Related U.S. Application Data

(62) Division of application No. 11/619,354, filed on Jan. 3, 2007, now Pat. No. 7,854,961, which is a division of application No. 10/864,063, filed on Jun. 9, 2004, now Pat. No. 7,180,068.

(51) Int. Cl.
*G01J 1/58* (2006.01)
*G01T 1/20* (2006.01)

(52) U.S. Cl.
USPC .......... 250/483.1; 250/361 R; 250/367; 250/484.4; 252/301.16; 252/301.4 R

(58) Field of Classification Search
USPC .. 250/361 R, 484.4, 367, 483.1; 252/301.16, 252/301.4 R
See application file for complete search history.

(56) References Cited

U.S. PATENT DOCUMENTS

| | | | |
|---|---|---|---|
| 4,050,905 A | 9/1977 | Swinehart | 23/301 |
| 4,242,221 A | 12/1980 | Cusano et al. | 252/301.4 |
| 4,341,654 A | 7/1982 | Swinehart | 252/301.4 |
| 4,525,628 A | 6/1985 | DiBianca et al. | 250/367 |
| 4,806,757 A * | 2/1989 | Kano et al. | 250/581 |
| 4,855,603 A | 8/1989 | Lindmayer | 250/484.1 |
| 5,171,555 A | 12/1992 | Kim et al. | 423/266 |
| 5,318,722 A | 6/1994 | Tsoukala et al. | 252/301.4 R |
| 5,360,557 A | 11/1994 | Tsoukala et al. | 250/361 R |
| 5,391,876 A | 2/1995 | Tsoukala et al. | 250/361 R |
| 5,474,708 A | 12/1995 | Mori et al. | 252/301.4 H |
| 5,521,387 A | 5/1996 | Riedner et al. | 250/367 |
| 5,562,860 A | 10/1996 | Grabmaier et al. | 252/301.4 S |
| 5,876,630 A | 3/1999 | Vinograd et al. | 252/301.4 H |
| 6,117,362 A | 9/2000 | Yen et al. | 252/301.4 R |
| 6,340,436 B1 | 1/2002 | Yamada et al. | 385/115 |

(Continued)

FOREIGN PATENT DOCUMENTS

| | | |
|---|---|---|
| EP | 03102341.9 | 7/2003 |
| WO | WO 01-03156 | 1/2001 |

OTHER PUBLICATIONS

Seo, H.J. et al. "Luminescence properties of a CsI crystal doped with $Eu^{2+}$ ions." J. Alloys & Comp. 344 (2002) 268-271.
Yamada, H. et al. "A Scintillator $Gd_2O_2S$:Pr,Ce,F for X-ray Computed Tomography." J. Electrochem. Soc. 136 (9), (1989), 2713-2716.

(Continued)

*Primary Examiner* — David Porta
*Assistant Examiner* — Yara Green
(74) *Attorney, Agent, or Firm* — Burns & Levinson LLP; Jacob N. Erlich; Orlando Lopez

(57) ABSTRACT

Scintillation materials of this invention have an alkali halide host material, a (first) scintillation dopant of various types, and a variety of second dopants (co-dopants). In another embodiment, the scintillation materials of this invention have an alkali halide host material, a (first) scintillation dopant of various types, a variety of second dopants (co-dopants), and a variety of third dopants (co-dopants). Co-dopants of this invention are capable of providing a second auxiliary luminescent cation dopant, capable of introducing an anion size and electronegativity mismatch, capable of introducing a mismatch of anion charge, or introducing a mismatch of cation charge in the host material.

2 Claims, 10 Drawing Sheets

(56) References Cited

U.S. PATENT DOCUMENTS

| | | |
|---|---|---|
| 6,344,233 B1 | 2/2002 | Jamil et al. .................... 427/65 |
| 6,358,441 B2 | 3/2002 | Duclos et al. ................ 264/1.22 |
| 7,135,690 B2 * | 11/2006 | Kaito ........................ 250/484.4 |
| 2001/0028700 A1 * | 10/2001 | Duclos et al. ................... 378/98 |
| 2002/0175291 A1 | 11/2002 | Reeder et al. ................. 250/369 |
| 2003/0062481 A1 | 4/2003 | Okada et al. .............. 250/361 R |
| 2003/0209675 A1 | 11/2003 | Maezawa et al. ........... 250/484.4 |
| 2004/0042585 A1 | 3/2004 | Nagarkar et al. ............ 378/98.8 |
| 2004/0069955 A1 | 4/2004 | Maezawa et al. ........... 250/484.4 |
| 2004/0084655 A1 * | 5/2004 | Vartuli et al. .......... 252/301.4 R |
| 2004/0146639 A1 | 7/2004 | Isoda .......................... 427/157 |
| 2005/0104000 A1 | 5/2005 | Kindem et al. ........... 250/361 R |

OTHER PUBLICATIONS

Ito, Y. et al. "Hot Isostatic Pressed $Gd_2O_2S$:Pr,Ce,F, Translucent Scintillator Ceramics for X-Ray Computed Tomography Detectors," Jpn. J. Appl. Phys. 27 (8) (1988), L1371-L1373.

Yoshida, M. et al. "Application of $Gd_2O_2S$ Ceramic Scintillator for X-Ray Solid State Detector in X-Ray CT." Jpn. J. Appl. Phys. 27 (8) (1988), L1572-L1575.

Polosan, S. et. al. "Influence of Alkali Impurities on the Optical Spectra of T-Centres." Moldavian J. of the Phys. Sci. N1, 2002, 61-64.

Trefilova, L. N. "Role of Sodium in Radiation Defect Formation in CsI Crystals." Rad. Meas. 33 (2001) 687-692.

\* cited by examiner

SCINTILLATION MATERIALS WITH REDUCED AFTERGLOW AND METHOD OF PREPARATION

CROSS REFERENCE TO RELATED APPLICATIONS

This application is a divisional of U.S. application Ser. No. 11/619,354, filed Jan. 3, 2007, entitled SCINTILLATION MATERIALS WITH REDUCED AFTERGLOW AND METHOD OF PREPARATION, which in turn is a divisional of U.S. application Ser. No. 10/864,063, filed Jun. 9, 2004, now U.S. Pat. No. 7,180,068, entitled SCINTILLATION MATERIALS WITH REDUCED AFTERGLOW AND METHOD OF PREPARATION, the contents all of which are hereby incorporated by reference in their entirety for all purposes.

STATEMENT OF GOVERNMENT INTEREST

This invention was made partially with U.S. Government support from the National Institutes of Health (NIH) under contract no. 1R43CA92806-1 (also referred to as CA92806). The U.S. Government has certain rights in the invention.

BACKGROUND

This invention relates generally to scintillation materials, and, more particularly, to scintillation materials with reduced afterglow.

Scintillation detectors are used in a wide variety of applications ranging from medical imaging to high-energy physics (HEP). The development of new scintillators with better properties, complemented by advances in silicon based readout technologies such as high-gain avalanche photodiodes (APDs), have significantly advanced the present detector state-of-the-art. High resolution x-ray detectors based on amorphous silicon sensor arrays (a-Si:H) or charge coupled devices (CCD) in conjunction with scintillator films have been developed, and are now routinely used in such applications as chest radiography and digital mammography. The medical community is particularly interested in new fast scintillators with high density and light output for applications in nuclear medicine, single photon emission computed tomography (SPECT), positron emission tomography (PET), computed tomography (CT), and diagnostic x-ray imaging.

While a wide variety of new scintillators are now available, doped alkali halide scintillators have proven useful and practical. This is especially true of CsI(Tl), which is a highly desired material for a wide variety of medical and industrial applications due to its excellent properties, low cost, and easy availability. Having the highest conversion efficiency of any known scintillator (64,000 photons/MeV), a rapid initial decay (680 ns), an emission in the visible range (540 nm), and cubic structure that allows fabrication into micro-columnar films, CsI(Tl) has found extensive use in radiological imaging applications. Furthermore its high density (4.53 g/cc), high atomic number (Z=54), and transparency to its own light have made it a material of choice for x-ray and gamma ray spectroscopy, homeland security applications, and nuclear medicine applications such as intra-operative surgical probes and SPECT.

Commercial applications such as CT require a very large number of scintillator elements, so that the cost and availability of the scintillation material and any necessary machining have become very important issues. For instance, the major advance in CT technology within the past few years has been the development of volumetric scanning capability using multiple ring detector systems that need as high as 10,000 detector elements per scanner, and over 2,000 such scanners are produced annually. The material cost of the $CdWO_4$ scintillator, which is currently used in such systems, is ~$40/cc compared to ~$ 1.6/cc of the CsI(Tl). Another new exotic material, which is now being used in CT systems, is ceramic GOS, which is even more expensive. Thus, replacing $CdWO_4$ or ceramic GOS with CsI(Tl) would result in substantial cost savings. Moreover, the machining of $CdWO_4$ pixels to dimensions as small as 0.8×0.8 mm becomes particularly expensive process due to the brittle nature of the crystal, resulting in significant material loss during processing. By comparison, CsI(Tl) is much easier to process, so that replacement of $CdWO_4$ with CsI(Tl) would result in significant savings in machining costs. Finally, high quality CsI(Tl) is widely available from a number of commercial vendors.

Another rapidly growing area with tremendous commercial impact is high-speed digital x-ray imaging. Such applications require imaging speeds ranging from 30 frames per second (fps) as in fluoroscopy to $10^6$ fps for analyzing ballistic impacts. Due to the limitations in the availability of x-ray flux, all such applications require a scintillator with, very high x-ray absorption and high light output. As such, CsI(Tl) can be a prime choice in such applications.

Despite the obvious advantages of CsI(Tl), a characteristic property that has hindered its use in CT and many other high speed imaging applications is the presence of a strong afterglow component in its scintillation decay. Although the initial decay of CsI(Tl) has a characteristic time of 680 ns, its residual afterglow at 2 ms after the excitation can be as high as 5% of the peak value, depending on the intensity and duration of the excitation pulse. This causes pulse pileup in high count rate applications, reconstruction artifacts in CT applications, and problems of reduced contrast and image blurring in high speed x-ray imaging.

CsI is a member of a family of halides that had been studied for decades. The scintillator aspects of some of these halides again came to the fore in the mid-nineties because of newly developed medical applications (CT, PET), and stimulated a great deal of research interest.

The archetype of all the alkali halide scintillators is NaI (Tl), which was discovered in 1948 and is still in some use today. Its companion alkali halide scintillators, KI(Tl) and KCl(Tl), have played a very important role in our understanding of scintillator phenomena but have not been considered as viable scintillators for practical use.

It is the presence of $Tl^+$ as an activator (a scintillation activator) that is responsible for the excellent scintillation properties of the alkali halides. Pure (undoped) NaI is not a good scintillator, emitting only poorly at room temperature. At 78K, however, it shows an emission band around 300 nm; this is similar to most other alkali halides, whose emission spectra are typical examples of self-trapped exciton $(V_k+e)$ emissions. All are strongly temperature quenched, making the decay time progressively shorter and reducing the efficiency of both radiative and excitonic transfer in most of these materials. Interestingly, CsI is a special case, in that it retains some luminescence even at room temperature. While thermal quenching keeps the quantum efficiency Q rather low, it also gives rise to a relatively fast (although non-exponential) decay of about 16 ns, making the material useful where speed is the primary concern.

Upon doping with $Tl^+$, however, the situation is changed radically, and CsI(Tl) has now become a highly important scintillator, as did NaI before it. The $Tl^+$ ion, substituting at an alkali metal site, is a well-known luminescent center, whose $5d^{10}\epsilon s^2$ configuration gives rise to a $^1S_0$ ground state and excited states $^1P_1, ^3P_0, ^3P_1, ^3P_2$. The luminescence takes place from the lowest lying $^3P_0$ triplet and is therefore spin-forbidden. The initial decay is on the order of 0.6 μs, which excludes CsI(Tl) from PET but still leaves it fast enough for many other applications such as CT, mammography, and digital radiography.

The physical mechanism of scintillation in alkali halides is as follows: When the material absorbs ionizing radiation, its energy is deposited into the lattice in the form of electron hole pairs (e-h pairs). However, since concentration quenching typically limits the Tl doping level to about the 1000-ppm range in CsI(Tl), very few of these charge carriers are formed close enough to the Tl ions to excite them directly. Thus, in order to reach the emitting center, almost all of the carriers must migrate over a significant distance. It is this migration of charge carriers, and their radiative recombination via the Tl ion, that constitutes the principal mechanism of scintillator light generation in CsI(Tl).

A serious problem in all alkali halides is that the mobility of carriers is very small due to self-trapping. This is particularly true for holes, leading to the formation of $V_k$ centers ($I_2^-$ molecules), which can move only by a temperature-dependent diffusive mechanism. Additionally, since charge states $Tl^0$ and $Tl^{2+}$ are known to exist and have lifetimes longer than the radiative lifetime of the $Tl^+$ emission, either holes or electrons can be trapped by the $Tl^+$ ions, which then have to wait for the second carrier to arrive.

This is a primary reason for the complexity of the scintillation process in the alkali halides. Electrons and holes produced by ionizing radiation can both be trapped at thallium activators since both $Tl^0$ and $Tl^{2+}$ are stable in most alkali halides. Accordingly, recombination can proceed by a number of different routes. Moreover, holes may also be self-trapped in the lattice, forming small polarons called $V_K$ centers that diffuse by thermally activated reorientation. Such $V_K$ centers in CsI(Tl), created by prolonged x-irradiation at low temperature, were investigated by the technique of magnetic circular dichroism of absorption (MCDA), from which it was concluded that the $Tl^+$ ions serve as shallow hole traps, and consequently that persistent afterglow is unavoidable in this material.

The carrier-mediated transfer in $Tl^+$-doped alkali halides is complex. As in all sequential processes, the overall rate is determined by the slowest step, which in the halide case is likely to be the motion of self-trapped holes (diffusing $V_k$ centers) or the detrapping of electrons. Hole motion would be difficult to detect if not for the fortunate happenstance of a well-defined 300 nm absorption band due to the $Tl^{2+}$ ion. The intensity and time dependence of this absorption provide all the information needed to define the hole capture kinetics. The contributions of the various processes manifest themselves at different times, and can also be readily affected by temperature. The resultant luminescent decay can be broken into three time domains detailed below.

1. Early Time Processes:

This contribution is largely due to the creation of an excited state $(Tl^+)^*$, such as by recombination between a free electron and a hole trapped at a Tl site. In both NaI(Tl) and KI(Tl) a $Tl^+$ ion captures a hole located in any of 25 neighboring unit cells, before that hole has had a chance to self-trap. This process is temperature-independent and determines the initial decay rate of the pulse, with a time constant characteristic of the $Tl^+$ ion (200 ns). The contribution of this component to the total light output is not very large, on the order of 10%. The hole motion is presumably a random walk from cell to cell, but rapid enough to allow it to reach the ion before becoming self-trapped. This process also plays an important role in some Ce-activated scintillators.

2. Intermediate Time Processes:

Here the major process is a thermally activated diffusion of $V_k$ (self-trapped holes), allowing them to reach and recombine with electrons trapped at thallium sites ($Tl^0$). This is the regime where individual halides differ because of the wide disparity in diffusion times, ranging from $10^{-9}$ s for NaI, $10^{-7}$ s for KI to $10^{-2}$ s for KCl. Consequently, the diffusion-controlled long component is considerably less important in NaI (Tl).

3. Long Time Processes:

Here the dominant mechanism involves the prompt capture of electrons and holes at different thallium sites (forming $Tl^0$ and $Tl^{2+}$, respectively), followed by thermal detrapping of electrons from $Tl^0$ and their subsequent capture by $Tl^{2+}$ to form $(Tl^+)^*$. This is the origin of the very long component in halide scintillators, particularly evident in KI(Tl) where it contains 75% of the light output and lasts over 200 ms.

There is a need for scintillation materials with reduced residual afterglow.

When utilized in radiation detectors, the cesium iodide (CsI) scintillator absorbs photons of a given energy and converts their energy into photons of a lower energy, the latter detectable by photodiodes or CCD arrays. These lower energy photons are guided towards a photodiode or CCD array where their energy is absorbed and used to generate charge or charge depletion. Cesium iodide (CsI) scintillators can have a single crystal structure or polycrystalline ceramic structure. In some applications, each of the photodiodes or CCD elements is a picture element (pixel) resulting in spatial sampling of the image, which is the first step in image digitization. In some detectors, the CsI scintillator is deposited directly on top of the photodiode array. In some applications, the CsI scintillator is grown in a multi-columnar structure (very thin needles) that channels the lower energy photons towards the photo-diode array. In other applications a lens, fiberoptic guide or air spaces may be used between the scintillator and the photodiode or CCD elements.

There is a need for a method to fabricate scintillation materials with reduced residual afterglow in a multiple columnar structure.

SUMMARY

Scintillation materials with reduced residual afterglow, methods for fabricate scintillation materials with reduced residual afterglow, where the scintillation materials have either single crystal or multiple columnar structure, and systems utilizing the materials of this invention are described hereinbelow.

Scintillation materials of this invention have an alkali halide host material, a (first) scintillation dopant of various types, and a variety of second dopants (co-dopants). In another embodiment, the scintillation materials of this invention have an alkali halide host material, a (first) scintillation dopant of various types, a variety of second dopants (co-dopants), and a variety of third dopants (co-dopants). Co-dopants of this invention are capable of providing a second auxiliary luminescent cation dopant, capable of introducing an anion size and electronegativity mismatch, capable of introducing a mismatch of anion charge, or introducing a mismatch of cation charge in the host material.

In one embodiment of the scintillation material of this invention, the base alkali halide material is cesium iodide; the first scintillation dopant includes a thallium cation; and, the second auxiliary luminescent cation dopant includes a europium cation.

A method to fabricate scintillation materials of this invention, where the scintillation materials have a multiple columnar structure, is also disclosed.

The material of this invention can be utilized in, but is not limited to, radiation detectors and radiation transmission analysis devices.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

Scintillation materials with reduced residual afterglow, methods to fabricate scintillation materials with reduced residual afterglow, where the scintillation materials have either single crystal or multiple columnar structure, and systems utilizing the materials of this invention are described hereinbelow.

In one embodiment, scintillation materials of this invention have an alkali halide host material, a (first) scintillation dopant of various types, and a variety of second dopants (co-dopants). In another embodiment, scintillation materials of this invention have an alkali halide host material, a (first) scintillation dopant of various types, a variety of second dopants (co-dopants), and a variety of third dopants (co-dopants). The co-dopants of this invention are selected to divert carriers away from the sources of the afterglow and recycle them rapidly enough to enhance the desired prompt emission.

The level of scintillation doping (activator concentration) required for an alkali metal halide scintillator depends upon the particular use of the scintillator. Factors affecting the choice of activator (scintillation dopant) for a scintillator and the concentration of the activator, are well known to those skilled in the art. In general, the level of activator (scintillation dopant) is less than about 10 mole percent, and more preferably is in the range of about 0.005 to 0.5 mole percent.

In order to describe the present invention, the invention is described with respect to, but not limited to, an embodiment having cesium iodide (CsI) as the host material and thallium cations as the scintillation activator dopant (CsI(Tl)). Other embodiments of alkali halide host material with a (first) scintillation activator dopant include, but are not limited to, alkali halides having a (first) scintillation dopant including Group IIIA metal cation of which a thallium cation is one embodiment, another embodiment being indium ($In^+$), a Group IVA metal cation such as a bivalent tin cation ($Sn^{2+}$) or a bivalent lead ($Pb^{2+}$) cation or a different halide, as in the embodiment of cesium iodide doped with sodium ($Na^+$). The first scintillation activator dopant provides centers that emit light due to mechanisms such as, but not limited to, radiative recombination.

Figure 1:
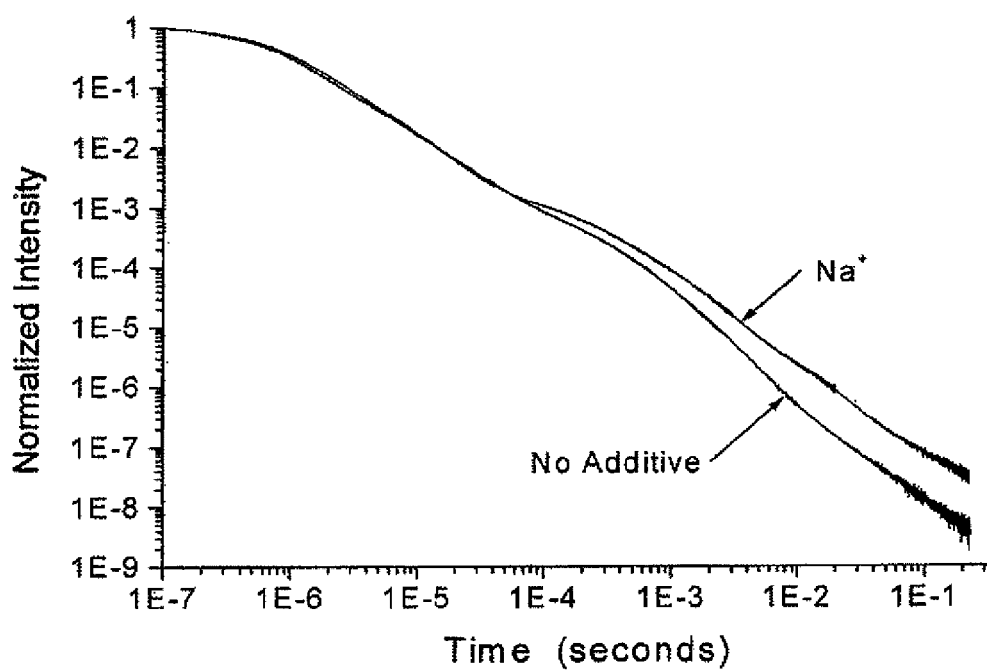
FIG. 1 is a graphical representation the scintillation behavior of standard CsI(Tl), without any codopants.

To better understand this invention, the scintillation behavior of standard CsI(Tl), without any co-dopants, is examined. Typical dopant molar concentration is an amount of substantially 0.2 to 0.6%. The behavior of standard CsI(Tl), without any co-dopants, is presented in FIG. 1 (as well as the four following Figures). On a log-log plot the trace appears to have three distinct regions: The earliest of these, immediately after the rounded peak, is essentially linear, up to about 0.1 ms. The late afterglow tail, after about 10 ms, is also linear, with a similar slope. In between, however, from approximately 0.1 to 10 ms, a distinct upward bulge can be observed.

In one embodiment, the co-dopant introduces auxiliary luminescent cations, In this embodiment, by adding another appropriate emitting (auxiliary luminescent) species into the CsI lattice, it may be possible to combine whatever chemical influence the co-dopant can exert in reducing the intermediate term afterglow (e.g., by charge mismatch) with an increased emission at earlier times, thereby making the residual afterglow even less significant relative to the initial peak. The approach is theoretically viable if the characteristic decay time of the emission from the additive is fast enough to direct a greater proportion into the desired early time regime.

In one embodiment, the co-dopant includes a lanthanide series cation. In a particular embodiment, the co-dopant includes a $Ce^{3+}$ ion. The resulting emission is strongly allowed, and has a decay time less than 100 ns. The $Ce^{3+}$ ion is compatible with halide as well as oxide hosts. And, additionally, the $Ce^{3+}$ ion co-dopant has the capability to exert a salutary influence on the long-term persistent emission tail of CsI(Tl).

Figure 2:
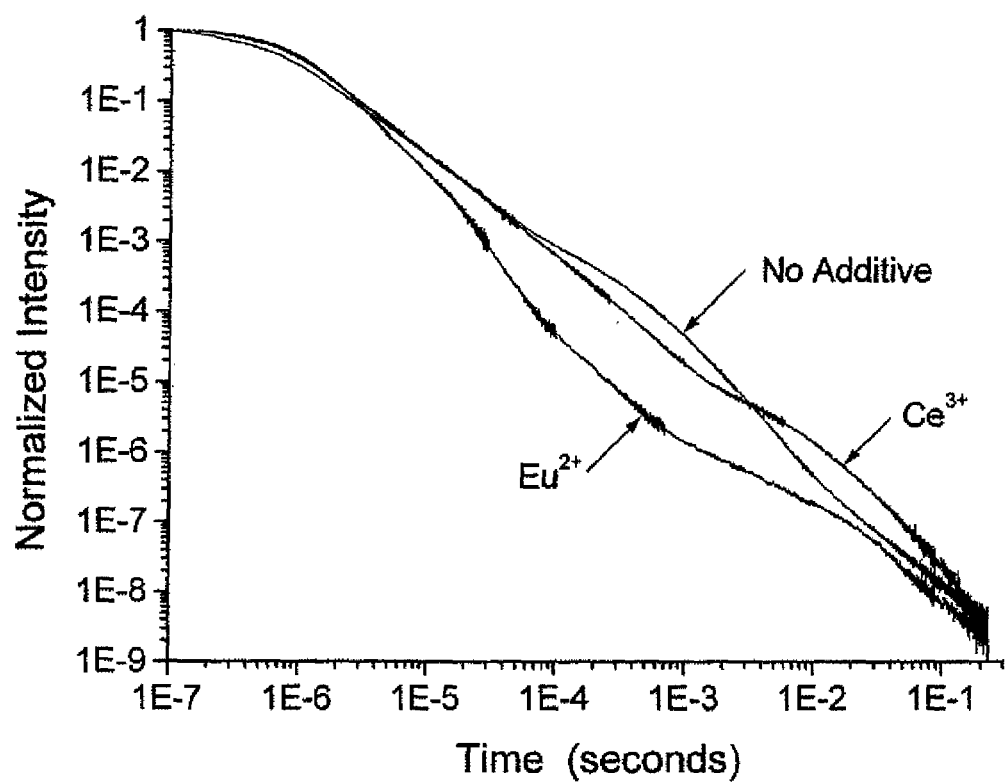
FIG. 2 is a graphical representation the of scintillation behavior of an embodiment of a scintillation material of this invention, CsI(Tl) with auxiliary luminescent cation co-dopants.

Shown in FIG. 2 is the decay behavior of one embodiment of CsI(Tl) co-doped with a co-dopant introducing $Ce^{3+}$. The $Ce^{3+}$ cation co-dopant behaves similarly to other cations with a charge mismatch. The $Ce^{3+}$ cation co-dopant redirects some of the total emission to the prompt peak (note the higher level of the trace extending as long as 10 μs).

Another rare earth (lanthanide series) ion, many of whose emission properties closely resemble those of $Ce^{3+}$ is $Eu^{2+}$. The $Eu^{2+}$ ion also has a strongly allowed emission, albeit with a somewhat longer decay time (≈1 μs). The $Eu^{2+}$ ion peak emission is in the blue, not much shorter than that of CsI(Tl). And the lower charge (+2 instead of +3) of the $Eu^{2+}$ ion makes it easier to incorporate into the CsI lattice. Also shown in FIG. 2 is the decay behavior of CsI(Tl) with a co-dopant introducing a $Eu^{2+}$ ion. The decay behavior of CsI(Tl) co-doped with $Eu^{2+}$ ion exhibits improvements of factors of fifty. Moreover, in the decay behavior of CsI(Tl) co-doped with $Eu^{2+}$ ion, there is an increase in the fraction of the total emission that occurs within the first few microseconds.

The embodiments utilized to generate FIG. 2 are crystalline samples. These embodiments of doped scintillator material crystals of this invention were fabricated using vertical Bridgman technique. For the embodiments utilized in FIG. 2, a charge of 6 g of CsI(Tl) and 0.2 mole % of the compound supplying the co-dopant cation(s), such as $EuI_2$ or $CeI_3$, (approximately 1.6 to 3.5 mg of material depending on the molecular weight of the co-dopant) was placed in a quartz ampoule and sealed under vacuum. The ampoule was passed through the heated zone (600 to 700 C depending on the co-dopant) at a rate of 10 mm/hr. Embodiments can be obtained in which the molar concentration of the cation introduced by the co-dopant (the auxiliary luminescent cations introduce by co-dopants such as $EuI_2$ or $CeI_3$ co-doping CsI (Tl)) is an amount of substantially 0.1% to substantially 10%, but the present invention is not limited to such range.

Figure 3:
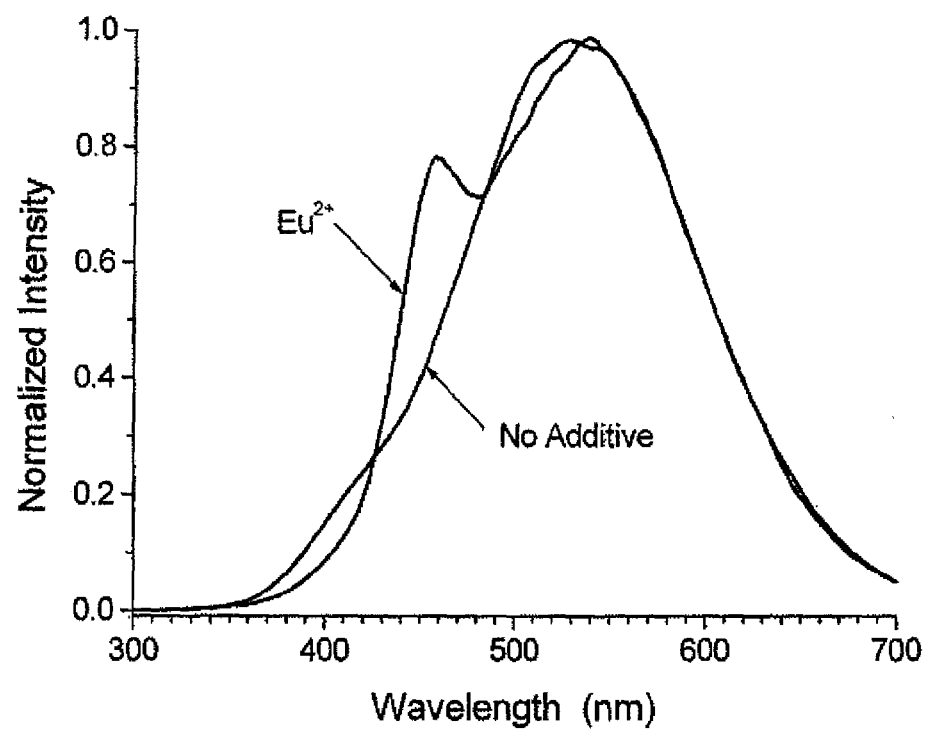
FIG. 3 is a graphical representation of a spectrum of the x-ray excited emission for one of the embodiments of the scintillation material of this invention from FIG. 2.

Considering the emission from CsI(Tl) co-doped with $Eu^{2+}$ ion, the width of the light pulse increases by approximately 18%, from 0.58 to 0.83 µs in one embodiment, with a commensurate increase in the integrated light. Considering spectrum of the x-ray excited emission (shown in FIG. 3), the emission from CsI(Tl) co-doped with $Eu^{2+}$ ion, exhibits a second peak at about 485 nm, corresponding to the characteristic emission of $Eu^{2+}$. Since this peak is comparable in magnitude to that of the CsI(Tl) emission without co-dopants, it can be surmised that the $Eu^{2+}$ co-dopant has not compromised the conversion efficiency of the CsI lattice.

Figure 4:
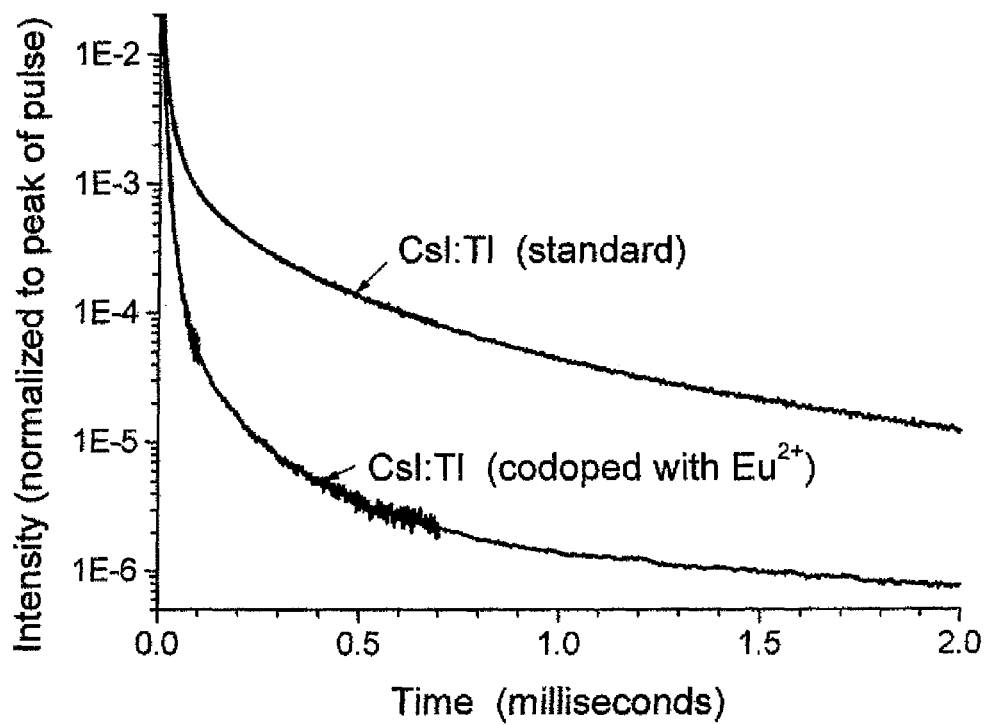
FIG. 4 is a graphical representation of the scintillation behavior of one of the embodiments of the scintillation material of this invention from FIG. 2.

Referring to FIG. 4, the addition of $Eu^{2+}$ suppresses the intermediate term afterglow of CsI(Tl) by as much as a factor of fifty. For the embodiments utilized in FIG. 4, a charge of 6 g of CsI(Tl) and 0.2 mole % of compound providing the co-dopant cation, $EuI_2$, was placed in a quartz ampoule and sealed under vacuum. The ampoule was passed through the heated zone (600 to 700 C) at a rate of 10 mm/hr. The beneficial influence of the addition of $Eu^{2+}$ extends from 10 µs to 100 ms, more than four orders of magnitude in time. In the millisecond regime, the improvement reduces the CsI(Tl) afterglow at a time 2 ms after excitation to a level of 0.01% or lower relative to the peak emission intensity reached during excitation. The molar concentration of the europium cation in the embodiments in which CsI(Tl) co-doped with $Eu^{2+}$ ion is an amount of substantially 0.1 to substantially 10%.

In another embodiment, the co-dopant introduces an anion size and electronegativity mismatch in the host material. In one embodiment, the co-dopants are alternative halides, which substitute at $I^-$ sites. Here we see some divergence of behavior. The scintillation behavior of CsI(Tl), with co-dopants that introduce an anion size and electronegativity mismatch, is shown in FIG. 5.

As can be seen from FIG. 5, although the later afterglow tail is enhanced for a fluoride co-dopant, there is significant improvement in the millisecond time scale, where the afterglow level is cut by as much as a factor of three. This behavior may be attributable to the extreme electronegativity of the fluoride ion, which may be introducing traps too deep for carriers to escape in this time regime.

Figure 5:
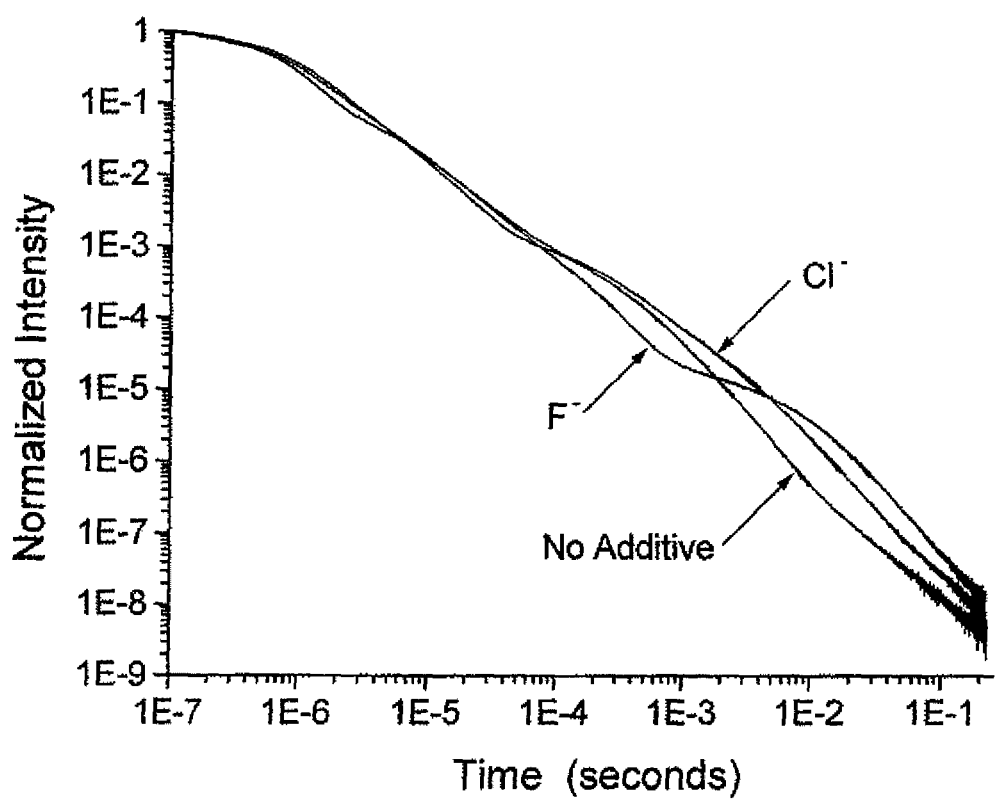
FIG. 5 is a graphical representation of the scintillation behavior of another embodiment of the scintillation material of this invention.

For the embodiments utilized in FIG. 5, a charge of 6 g of CsI(Tl) and 0.2 mole % of the compound supplying the co-dopant anion(s), such as CsCl, CsF or CsBr, was placed in a quartz ampoule and sealed under vacuum. The ampoule was passed through the heated zone (600 to 700 C depending on the co-dopant) at a rate of 10 mm/hr. Embodiments can be obtained in which the molar concentration of the co-dopant anion in the embodiments in which the co-dopant introduces an anion size and electronegativity mismatch in the host material (such as CsCl, CsF or CsBr co-doping CsI(Tl)) is an amount of substantially 0.1% to substantially 10%, but the present invention is not limited to such range.

Figure 6:
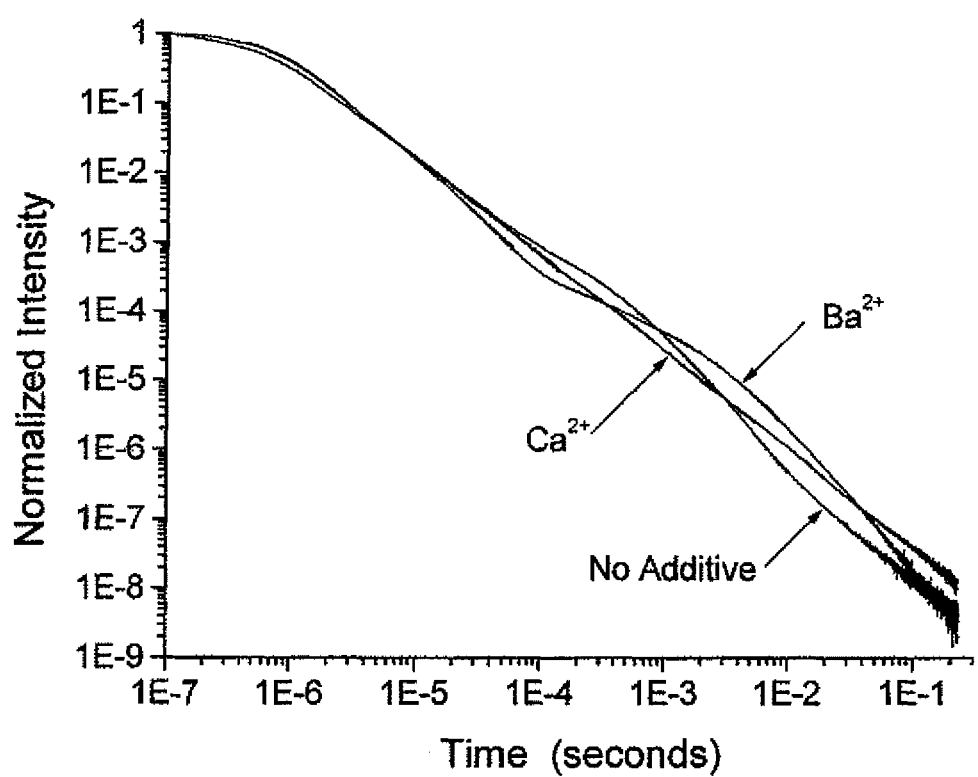
FIG. 6 is a graphical representation of the scintillation behavior of yet another embodiment of the scintillation material of this invention.

In yet another embodiment, the co-dopant introduces a mismatch of cation charge. In one embodiment, the co-dopant is an alkaline earth cation. The scintillation behavior of CsI(Tl), with co-dopants that introduce a mismatch of cation charge is shown in FIG. 6. The co-dopant cations shown in FIG. 6 reduce the afterglow level in the millisecond range. Calcium cation co-dopants provide improvement in the 0.1-10 millisecond range.

For the embodiments utilized in FIG. 6, a charge of 6 g of CsI(Tl) and 0.2 mole % of the compound supplying the co-dopant cation(s), such as $CaI_2$, or $BaI_2$, was placed in a quartz ampoule and sealed under vacuum. The ampoule was passed through the heated zone (600 to 700 C depending on the co-dopant) at a rate of 10 mm/hr Embodiments can be obtained in which the molar concentration of the co-dopant cation in the embodiments in which the co-dopant introducing a mismatch of cation charge (such as $CaI_2$ or $BaI_2$ co-doping CsI(Tl)) is an amount of substantially 0.1% to substantially 10%, but the present invention is not limited to such range.

Figure 7:
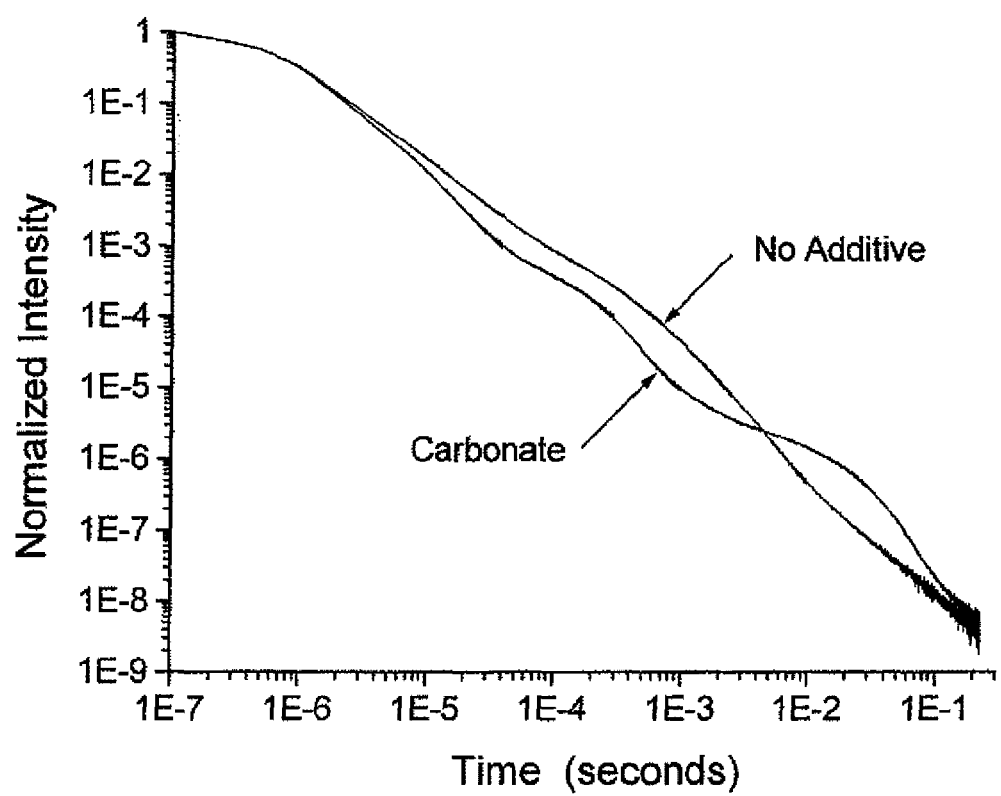
FIG. 7 is a graphical representation of the scintillation behavior of a further embodiment of the scintillation material of this invention.

In a further embodiment, the co-dopant introduces an additional anion charge mismatch. Introduction of an anionic charge mismatch into CsI(Tl) is not as straightforward as in the cationic case. The $O^{2-}$ ion is a reasonable candidate. But both cesium oxide and hydroxide are hygroscopic as well as corrosive to glass at elevated temperatures, necessitating an indirect approach. This can be achieved by using the carbonate or bicarbonate of cesium, both of which undergo substantial thermal dissociation at temperatures well below the melting point of CsI. The scintillation behavior of CsI(Tl), identical with either carbonate or bicarbonate as co-dopants, is illustrated in FIG. 7; this resembles that of $F^-$, but is somewhat greater in degree. Moreover, the afterglow decrease covers a wider range, beginning after only 20 µs and extending almost three orders of magnitude.

For the embodiments utilized in FIG. 7, a charge of 6 gm of CsI(Tl) and 0.2 mole % of the compound supplying the co-dopant anion(s), such as $CsHCO_3$, $Cs_2CO_3$ or $Cs_2SO_4$, was placed in a quartz ampoule and sealed under vacuum. The ampoule was passed through the heated zone (600 to 700 C depending on the co-dopant) at a rate of 10 mm/hr. Embodiments can be obtained in which the molar concentration of the co-dopant anion in the embodiments in which the co-dopant introduces an anion charge mismatch in the host material (such as $CsHCO_3$, $Cs_2CO_3$ or $Cs_2SO_4$ co-doping CsI(Tl)) is an amount of substantially 0.1% to substantially 10%, but the present invention is not limited to such range.

The scintillation behavior of CsI(Tl), with either carbonate or bicarbonate as co-dopants exhibits an enhancement in the longer-term afterglow tail. In another embodiment, having substantially the same result as carbonate and bicarbonate as co-dopants, the co-dopant is a sulfate anion.

It should be noted that although the above embodiments have been described as separate co-dopants, any embodiment could be utilized as a second co-dopant with another embodiment utilized as a first co-dopant. Similarly, any embodiment could be utilized as a third, fourth, or fifth co-dopant and so on. Since co-dopants of this invention are selected to divert carriers away from the sources of the afterglow utilizing different processes and affecting different regions of the afterglow behavior of the host material doped with a scintillation activator, CsI(Tl) in the embodiment described above, co-dopants can be used in combination to obtain a desired afterglow response. In one embodiment, the scintillation material of this invention has an alkali halide host material, a (first) scintillation activator dopant, a (second dopant) co-dopant that introduces an auxiliary luminescent cation dopant and a (third dopant) co-dopant capable of introducing an anion size and electronegativity mismatch in the host material. In other embodiments, the third dopant is capable of introducing a mismatch of anion charge, or capable of introducing a mismatch of cation charge in the host material. Further embodiments include embodiments in which the second dopant is capable of introducing an anion size and electronegativity mismatch in the host material and the third dopant is capable of introducing a mismatch of anion charge, or capable of introducing a mismatch of cation charge in the host material and embodiments in which the second dopant is capable of introducing a mismatch of cation charge in the host material and the third dopant is capable of introducing a mismatch of anion charge, or capable of introducing an anion size and electronegativity mismatch in the host material. Similarly, any embodiment could be utilized as a third or fourth co-dopant and so on.

Figure 8:
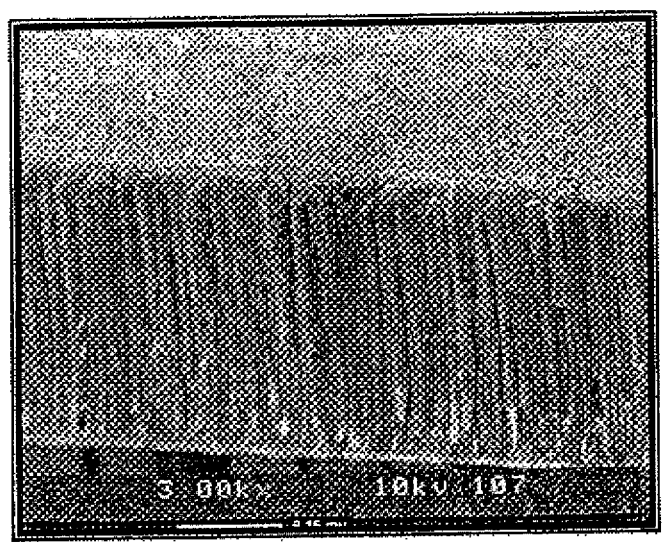
FIG. 8 is a pictorial representation of the structure of an embodiment of the scintillation material of this invention prepared by the method of this invention.

Utilizing an embodiment of the method of this invention co-doped CsI(Tl,Eu) can be produced in the form of microcolumnar films (also referred to as multi-columnar). The microcolumns effectively subdivide the deposited area into individual pixels, with the concomitant improvement in resolution. The method of this invention co-doped CsI(Tl,Eu) by means vapor deposition of doped material. Since the vapor pressures of the various constituents differ by many orders of magnitude at the temperature of growth, the sources that generate the constituent vapors must be maintained at different pre-selected temperatures. In one embodiment, glass or graphite substrates are used, mounted on a stationary planet placed 25 cm from the source boats and maintained at 250 C during the deposition cycle. The deposition was performed under high vacuum ($10^{-6}$ Torr) conditions. FIG. 8 shows an SEM of a CsI film codoped with both Tl and Eu produced in this manner.

In the embodiment shown in FIG. 8, a charge of 100 g CsI(Tl) was placed in a source boat. Similarly, $EuI_2$ and $CeI_3$ (2-5 g) were placed in separate source boats. Substrates were mounted on a planetary substrate holder placed approximately 30.5 (12 inches) away from the source boats. The system was evacuated to $10^{-6}$ torr. Argon gas was introduced to maintain the process pressure in the range of 1 to 10 mtorr. Temperature of various source boats was adjusted to control the rate of vapor deposition. The CsI(Tl) source boat temperature was approximately 700 C, the $EuI_2/CeI_3$ boat temperature was between 450 C to 550 C.

Although a detailed embodiment of the method was utilized to obtain the sample shown in FIG. 8, it should be noted that the method of this invention can be practiced with an alkali halide host material, a first dopant capable of acting as a scintillation activator in the host material, and a variety of second dopants including an auxiliary luminescent cation dopant, a dopant capable of introducing a mismatch of anion charge in the host material, a dopant capable of introducing an anion size and electronegativity mismatch in the host material, or a dopant capable of introducing a mismatch of cation charge in the host material. Similarly, the method of this invention can be utilized to introduce a third dopant from the same variety of dopants detailed herein above. The source of generate the constituent vapor of the third dopant must be maintained at a different preselected temperature.

It should be noted that although in the above description of the method of this invention the source boat temperature was controlled, an equivalent method would include controlling the temperature of the material in each source boat. By selecting the temperature of each source boat, the temperature of the material in each source boat is selected.

Figure 9:
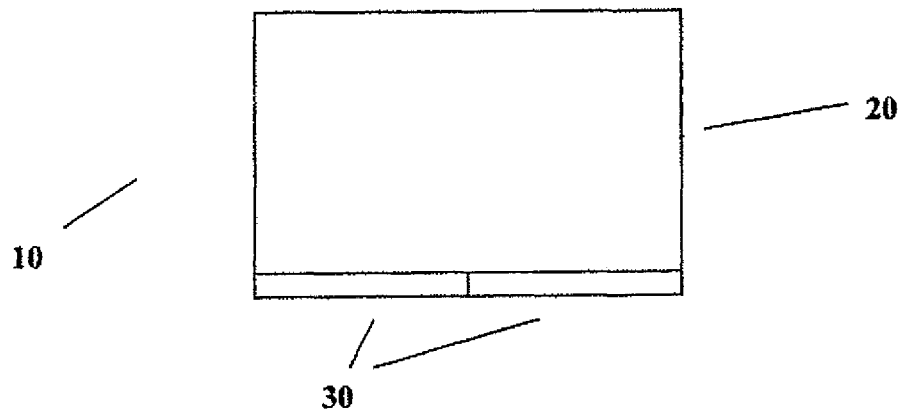
FIG. 9 is a graphical schematic representation of a radiation detector of this invention; and, FIG. 10 is a graphical schematic representation of a radiation transmission analysis device of this invention.

In another embodiment of the method of this invention, the substrate includes an array of photodetectors. Such an embodiment enables the fabrication of a radiation detector. FIG. 9 shows a radiation detector 10 of this invention. The scintillation material 20 includes an alkali halide host material, a (first) scintillation dopant of various types, and a variety of co-dopants as disclosed herein above. The scintillation material is disposed over one or more photodetectors 30, or an array of photodetectors, where the photodetectors may be, but are not limited to, high-gain avalanche photodiodes (APDs), amorphous silicon sensor arrays (a-Si:H) or charge coupled devices (CCD). The scintillation material may be fabricated, but not limited to, the method describe herein above, or may be fabricated as a single crystal by conventional methods, or as a polycrystalline ceramic structure fabricated by conventional methods, such as, but not limited to, the methods described in U.S. Pat. No. 4,242,221, incorporated by reference herein.

In yet another embodiment of the method of this invention, an amount of an alkali halide host material doped with a scintillation activator and an amount of a compound supplying a dopant, are placed inside a quartz ampoule (container). The dopant is selected from the group consisting of a dopant capable of introducing an auxiliary luminescent cation in the host material, a dopant capable of introducing a mismatch of cation charge in the host material, and a dopant capable of introducing an anion size and electronegativity mismatch in the host material. The amount of the compound is such that a resulting molar concentration of the dopant is between substantially 0.1% and substantially 10%. The ampoule is sealed under vacuum. The sealed ampoule is placed in a heated zone, a temperature of the heated zone being such that the doped host material and the dopant melt. The sealed ampoule is then displaced with respect the heated zone. The rate of displacement is selected such that the melted host material and dopant cool at a rate at which crystallization initiates. In one embodiment, the rate is less than 14 mm/hr and the temperature of the heated zone is between 550 C and 750 C.

In a detailed embodiment of the above described method of this invention, the host material is cesium iodide (CsI) doped with thallium as the scintillation activator (CsI(Tl)) in an amount of 6 g. The molar concentration of the compound supplying the dopant is 0.2 mole % (approximately 1.6 to 3.5 mg of material depending on the molecular weight of the dopant). The ampoule is passed through the heated zone (600 to 700 C depending on the co-dopant) at a rate of 10 mm/hr.

In still another embodiment of the method of this invention, an amount of a compound supplying a second dopant is also placed inside the quartz ampoule. The second dopant is selected from the group consisting of a dopant capable of introducing an auxiliary luminescent cation in the host material, a dopant capable of introducing a mismatch of cation charge in the host material, a dopant capable of introducing a mismatch of anion charge in the host material, and a dopant capable of introducing an anion size and electronegativity mismatch in the host material. The amount of the compound supplying the second dopant is such that the molar concentration of the second dopant is between substantially 0.1% and substantially 10%.

The radiation detector of this invention can be utilized in devices that are used for imaging/analysis purposes. Although these imaging/analysis devices are most commonly utilized in diagnostic imaging, their utility is not restricted to this field, and they are found in security applications, baggage inspection, industrial inspection, cargo inspection, aircraft quality control processes and the like. One class of these imaging/analysis devices comprises the detection of transmitted radiation from a source. Examples of, but not limited to, such imaging/analysis devices are x-ray fluoroscopy, computed radiography and digital radiography, where an x-ray source and a plate are placed on opposite sides of the subject to be examined, and the absorption of the x-rays along their path to the detector produces an image of the object being examined. In another example, but not limited to, of such imaging/analysis devices, one or more sources of x-rays move along an arc around the subject and are detected on the opposite side by an arc of stationary or synchronously moving detectors. CT scanners are one example of such devices. In the above-described embodiments, the penetrating radiation is typically x-rays. In other embodiments, the penetrating radiation can be, but is not limited to, gamma rays or visible or infrared light.

Another class, but not limited to, of such imaging/analysis devices are used to detect emitted radiation from the subject, this radiation excited by an external source (as in light and x-ray fluorescence or neutron activation) or resulting from an injected material (typical of nuclear medicine applications, which include single photon emission computed tomography, SPECT, and positron emission tomography, PET).

In some embodiments of the imaging/analysis devices, emission and transmission devices are combined. In some embodiments, the emission image provides physiologic information and the transmission image provides any of landmark visualization, data for correction of the emission image for absorption effects, and/or diagnostic information.

All these devices have common requirements on the radiation detection elements: Scintillators need to provide as much light as possible (to improve energy resolution and signal-to-noise levels), must have fast decay to support rapid operation, need high stopping power for efficiency and dose reduction, and need to be economically produced and easily fabricated. Some devices, such as, but not limited to, CT scanners, may have thousands and even tens of thousands of individual detectors, and images may be formed in tens of milliseconds.

Although using different processes, these imaging devices have common needs for their detectors. Hereinafter, this class of devices is referred to as penetrating radiation imaging/analysis devices.

Figure 10:
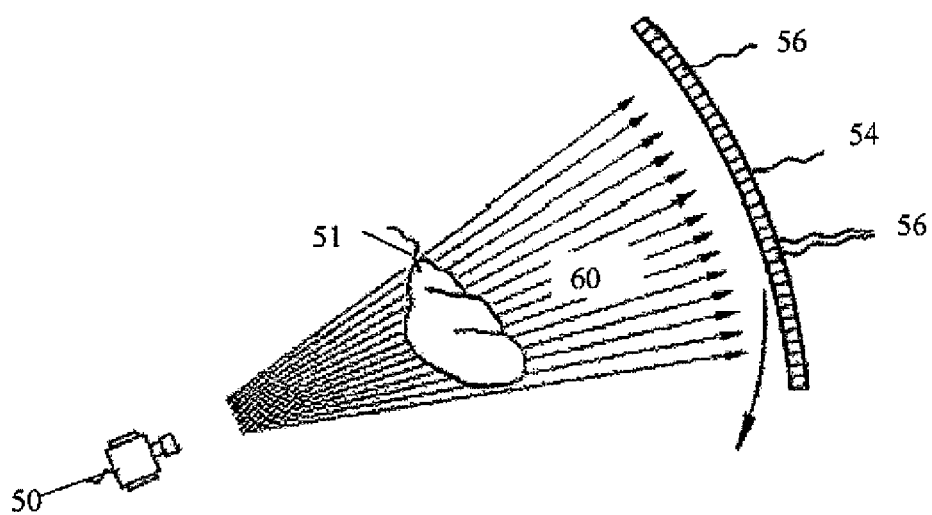

FIG. 10 shows as an embodiment of a penetrating radiation imaging/analysis device 40 utilizing radiation detectors 56 including the scintillation material of this invention. The detectors 56 are configured for use in a detector array 54. (In other embodiments, one or more detectors could be used. Also in other embodiments, the detector array could be in several different configurations. The configuration shown corresponds to a particular embodiment but other configurations can be used.) In the embodiment of the penetrating radiation imaging/analysis device 40 shown in FIG. 10, a source of radiation 50 emits a beam of radiation 60 passing through the object 51 under examination. (It should be noted that the source 50 could be, in some embodiments, located inside the object 51.) The emitted beam of radiation 60, having passed through the object 51, impinges upon the radiation detectors 56. The resultant light emitted by the scintillator of this invention (20, FIG. 9) in each radiation detector 56 is converted into an electrical signal through an appropriate photoelectrically responsive device (30, FIG. 9), such as a photodiode. The resultant electrical signal outputs are analyzed by a high-speed computer (not shown) which generates a two-dimensional array of data representing the absorption coefficients for various locations within the object 51 within the plane of the radiation beam 60. The absorption information is then converted to visual form and displayed on an image display device (also not shown).

While in the embodiment of the penetrating radiation imaging/analysis device 40 shown in FIG. 10 the beam of radiation 60 passes through the object 51, embodiments in which the penetrating radiation imaging/analysis device receives the radiation directly from the source of radiation without the intervening object are also possible.

Although the invention has been described with respect to various embodiments, it should be realized this invention is also capable of a wide variety of further and other embodiments within the spirit and scope of the appended claims.

What is claimed is:

1. A radiation detector comprising:
   a scintillator, said scintillator comprising:
      a cesium iodide host material;
      a first dopant comprising a thallium cation, a molar concentration of said first dopant being less than about 10%; and
      a second dopant comprising a europium cation; the second dopant resulting in the scintillator having substantially reduced afterglow;
   a molar concentration of said second dopant being between substantially 0.1% and substantially 10%.

2. A penetrating radiation imaging/analysis device comprising:
   at least one radiation detector, said at least one radiation detector comprising:
      a scintillator, said scintillator comprising:
         a cesium iodide host material;
         a first dopant comprising a thallium cation, a molar concentration of said first dopant being less than about 10%; and
         a second dopant comprising a europium cation; the second dopant resulting in the scintillator having substantially reduced afterglow;
         a molar concentration of said second dopant being between substantially 0.1% and substantially 10%; and
      a photodetector, said photodetector receiving electromagnetic radiation emanating from said scintillator.

* * * * *